Feb. 4, 1958  A. C. ANDEREGG ET AL  2,822,006
HYDRAULIC SAW MILL LONG PISTON CARRIAGE FEED
Filed Dec. 1, 1954
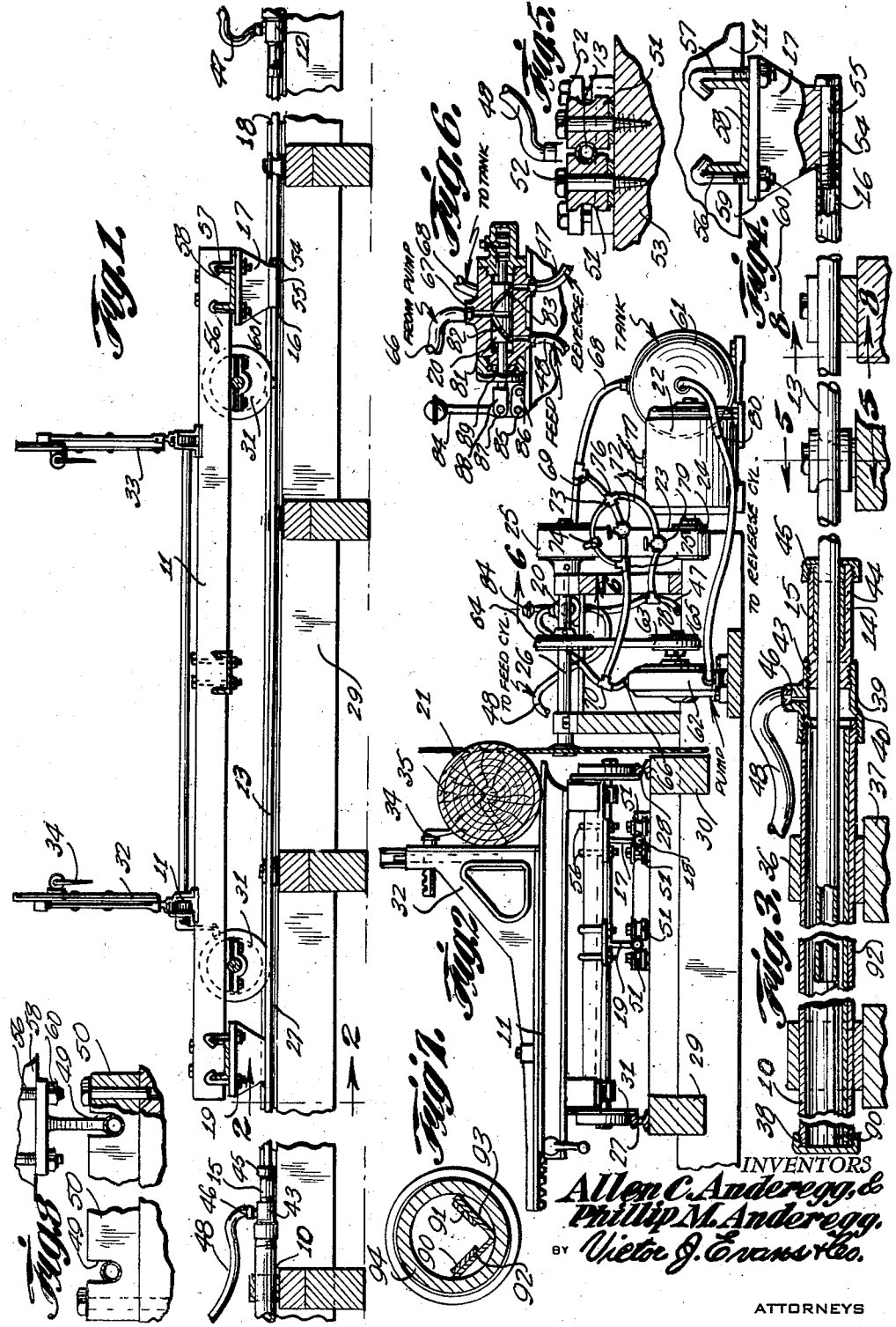
INVENTORS
Allen C. Anderegg, &
Phillip M. Anderegg.
BY Victor J. Evans & Co.
ATTORNEYS

United States Patent Office 2,822,006
Patented Feb. 4, 1958

2,822,006

HYDRAULIC SAW MILL LONG PISTON CARRIAGE FEED

Allen C. Anderegg and Phillip M. Anderegg, Charlottesville, Va.

Application December 1, 1954, Serial No. 472,432

8 Claims. (Cl. 143—108)

This invention relates to operating means of saw mill carriages and elements thereof, and in particular, a stationary elongated cylinder, preferably formed of pipe or tubing, mounted in combination with the rails of a track of a saw mill carriage, a piston rod, also preferably formed of pipe or tubing mounted on a carriage and positioned to slide through a packing gland in the end of the cylinder and opening into the cylinder, and means for supplying fluid under pressure to the cylinder whereby with a cylinder and piston rod positioned at each end of a carriage the carriage is actuated in the sawing and return operations with positive movements and at relatively high speed.

The purpose of this invention is to provide means for forming comparatively long cylinders and hollow piston rods for operating the carriage of a saw mill in which the force for actuating the piston rods is applied inside of the extended ends of the rods whereby the rods are shot outwardly without causing buckling or binding in the rods, wherein pulleys, cables, chains, racks and gears are eliminated and wherein the cylinders are designed for economical construction and long life.

Various attempts have been made to operate saw mill carriages with long hydraulic cylinders, however, with conventional cylinders having pistons carried by piston rods it is necessary to machine inner surfaces of the cylinders and it is also necessary to maintain the cylinders in alignment. To bore, or otherwise machine cylinders from 20 to 60 feet long or longer to insure a sealing fit of a piston is a costly operation and owing to the rough use saw mill carriages and tracks thereof are subjected it is difficult, if not impossible, to maintain such cylinders in alignment. Binding which takes place between piston rods and bearings or packing glands and pistons and cylinders retards the operation of the carriage and also increases the power required to drive the carriage.

With these thoughts in mind, long hydraulic cylinders have not been considered practical and are not used for operating saw mill carriages except in very rare instances. This invention, however, provides means for operating a saw mill carriage with force applied to the inner extended ends of piston rods secured to the carriage, and with conventional pistons on the inner ends of the piston rods omitted whereby fluid pressure of the cylinders acts directly upon the extended end of a piston rod which is surrounded by fluid. Accurate machining is not required for this type of cylinder so that conventional pipe or tubing may be used and as there is considerable clearance between the rods and inner surfaces of the walls of the cylinders absolute alignment is not necessary.

The object of this invention is, therefore, to provide means for forming elongated hydraulic cylinders whereby tubes or rods forming piston rods and attached to a saw mill carriage may be extended through packing glands into pipes fixedly mounted between tracks upon which the carriage is positioned so that the carriage is adapted to be actuated by pressure of fluid in the pipes or cylinders acting directly against the rods or tubes slidably mounted therein.

Another object of the invention is to provide means for operating a saw mill carriage with hydraulic cylinders whereby the saw mill is adapted to be operated by a single operator from any point adjacent a saw of the saw mill, or from any point desired.

It is yet another object of the invention to provide hydraulic cylinders for operating a carriage of a saw mill in which the diameters of the pistons are less than the inside diameters of the cylinders wherein wearing elements are provided in the cylinders for receiving and supporting inner ends of piston rods or tubes extended into the cylinders.

A further object of the invention is to provide hydraulic cylinders for operating a carriage of a saw mill in which regulating means is provided in connections from a source of fluid under pressure to cylinders for operating the carriage whereby the speed of travel of the carriage is directly controlled.

A still further object is to provide hydraulic cylinders suitable for operating a carriage of a saw mill in which the cylinders and parts associated therewith are of simple and economical construction.

With these and other objects and advantages in view, the invention embodies a saw mill having a track with spaced rails, a carriage mounted to travel on the track with wheels positioned on the rails, piston rods carried by ends of the carriage and positioned to extend below the carriage and from opposite ends thereof, stationary cylinders mounted between the rails of the track and positioned to receive the piston rods, packing glands in inner ends of the cylinders and means for supplying fluid under pressure to said cylinders.

Other features and advantages of the invention will appear from the following description, taken in connection with the drawing, wherein:

Figure 1 is a longitudinal section through a track of a saw mill looking from the saw side of the carriage showing a carriage with the wheels on one side of the carriage positioned on a rail at one side of the track, sections at the ends of the track being broken away.

Figure 2 is a cross section through the track taken on line 2—2 of Figure 1, the carriage being shown in elevation.

Figure 3 is a longitudinal section through one of the hydraulic cylinders by which the saw mill carriage is actuated, parts of the cylinder being broken away and parts being shown on an enlarged scale.

Figure 4 is an elevational view with parts shown in section illustrating the extended end of one of the piston rods of the cylinders with the parts shown on an enlarged scale and illustrating a bracket for connecting the piston rod to a transversely disposed beam of a carriage.

Figure 5 is a cross section taken on line 5—5 of Figure 4 showing a pair of rollers for supporting one of the piston rods.

Figure 6 is a longitudinal section taken on line 6—6 of Figure 2 with the parts shown on an enlarged scale and illustrating a control valve by which fluid under pressure is applied to the cylinders.

Figure 7 is a cross section through one of the hydraulic cylinders showing a modification wherein wearing elements are provided on a V-shaped support in the cylinder, the parts being shown on an enlarged scale.

Figure 8 is a view showing a guide for retaining the rod in alignment.

Referring now to the drawing, wherein like reference characters denote corresponding parts, the improved saw mill carriage operating means of this invention includes a stationary cylinder 10 positioned to extend from one end of a carriage 11, a stationary cylinder 12 positioned to extend beyond the opposite end of the carriage, a tubular piston rod 13 adapted to extend through a packing gland 14 in a tube 15 at the inner end of the cylinder 10 and positioned with one end 16 secured to a bracket 17 on the end of the carriage 11 opposite to the end from which the cylinder 10 extends, a tubular piston rod 18 mounted with a bracket 19 on the end of the carriage opposite to that from which the cylinder 12 extends, the ends of said tubular piston rods opening into their respective stationary cylinders and a control valve 20 for directing fluid under the cylinders, whereby with the fluid under pressure supplied to the cylinder 10 the carriage 11 is driven from the position shown in Figure 1 to the left and with the fluid supplied to the cylinder 12 the carriage is driven to the right.

This combination of cylinders, piston rods, and a saw mill carriage is designed to be applied to saw mills of different types and designs and the hydraulic actuating and control cylinders, as disclosed and described, are particularly suitable for actuating the carriage in both the sawing and return operations. The different elements of the carriage are also adapted to be operated by cylinders and hollow piston rods of the same type and design.

In the design shown in the drawing, a saw mill, which is provided with a saw 21, actuated by a motor 22 through a belt 23 and pulleys 24 and 25 and arbor 26 is provided with a track having rails 27 and 28 mounted on beams 29 and 30 and the carriage 11 is mounted on the rails with wheels 31. The carriage is provided with head blocks 32 and 33, and prongs 34 for gripping logs, as indicated by the numeral 35, are adjustably mounted on the head blocks.

The cylinders 10 and 12 are supported in blocks or bearings 36 on cross members 37 of the track and although it is preferred to make the blocks 36 of wood it will be understood that blocks of any suitable material may be used.

With the parts as illustrated in Figure 3, the extended ends of the cylinders are closed with caps 38 and the opposite ends are provided with reducing fittings 39, the large ends 40 of which are threaded on the ends of the cylinders and the small ends 41 of which being threaded on the sleeves 15. The packing glands 14 are provided in recesses 44 in the sleeves and the ends of the sleeves are closed with caps 45. The fittings 39 are provided with nipples 46 to which fluid supply tubes 47 and 48 are connected.

The tubular piston rods 13 are preferably positioned to slide through openings in the blocks 50 although they may be positioned in recesses 49 in such blocks, as shown in Figure 8, or the tubes may be secured between rollers such as rollers 51 shown in Figure 5, the rollers being mounted on lag screws or bolts 52 which are threaded in cross members 53, similar to the members 37. The tubular piston rods may, therefore, be mounted and retained in position by suitable means.

The ends of the piston rods 13 are secured by bolts 54 in hubs 55 at the lower ends of the brackets 17 and, as shown in Figure 4, the bolts are threaded into the ends of the piston rods and the pressure of the fluid for actuating the rods is applied to ends of the bolts. The upper ends of the brackets 17 are secured by angle bolts 56 and 57 to channel shaped cross members 58, at the ends of the carriage 11, the bolts being positioned in openings in a flange 59 and being retained in position with nuts 60.

It will be understood that the cylinders 10 and 12 may be supplied with fluid under pressure from a storage tank, such as tank 61, or by other suitable fluid pressure means, and in the design shown, the device is provided with a pump 62 driven by a belt 63 which is trained over a pulley 64 on the arbor 26 and a pulley 65 on the shaft of the pump whereby the pump is actuated with the operation of the saw.

A discharge connection 66 of the pump 62 extends through a connection 67 of the control valve 20, the valve having the feed connection 47 which extends to the cylinder 10 and the reverse connection 48 which extends to the cylinder 12. The valve is also provided with a return connection or by-pass 68 that extends to the tank 61.

The discharge connection 66 of the pump 62 is provided with a by-pass 69 connected to the tube 66 with a fitting 70 and to the tube 68 with a fitting 71 and the by-pass 69 is provided with a control valve, as indicated by the numeral 72.

The by-pass 69 is provided with a further by-pass 73 having a relief valve 74 therein and the by-pass 73 is connected to the by-pass 69 with a fittting 75 which is positioned on one side of the valve 72 and with a cross fitting 76 which is positioned on the opposite side thereof. The fitting 76 also provides a connection for one end of a by-pass 77, the opposite end of which is connected to the feed connection 47 with a fitting 78 and the by-pass 77 is provided with a valve 79. A connection 80 is provided from the tank 61 to the suction side of the pump 62, forming a closed series of connections.

The control valve 20 is provided with a core 81 having passages 82 and 83 therein and the core is adapted to be actuated by a hand lever 84 pivotally mounted by a pin 85 at one end of a bracket 86 extended from the valve body and the lever 84 is pivotally connected by a pin 87 to a yoke 88 on the end of a stem 89 of the core 81. It will be understood, however, that a valve of any suitable type may be used for directing fluid under pressure alternately to the cylinders 10 and 12 whereby the carriage 11 may readily be actuated to travel in the sawing and return operations.

As illustrated in Figure 7, the cylinders 10 and 12 may be provided with wearing elements 90 and 91 positioned on arms 92 and 93, respectively, of a support with the support positioned in the lower side of a cylinder 94, similar to one of the cylinders 10 or 12.

As illustrated in Figure 2, the piston rods 13 of the cylinders are mounted in spaced relation on the carriage and the rods are suspended below cross members, such as the members 58, of the carriage.

With the cylinders 10 and 12 aligned with the piston rod 13, the carriage is free to slide back and forth with pressure in the cylinders relieved.

To drive the carriage longitudinally of the track, the valve 20 is actuated to supply fluid under pressure, selectively, to one of the cylinders 10 or 12 whereby with the fluid extended throughout the length of the piston rod pressure is applied to the inner end of a rod so that instead of pushing the piston rod from the cylinder the piston rod is drawn outwardly by the pressure of the fluid, and with the fluid under a pressure of 1000 pounds or more the pistons are shot from the ends of the cylinders similar to a projectile fired from a gun, and as the carriage approaches the end of its travel the pressure is first relieved and then reversed whereby it is applied to the cylinder at the opposite end so that the carriage is driven back to its original position. The speed of travel of the carriage is readily controlled by the valves, the by-pass connections and also by the pressure of the fluid.

With the pressure of the fluid applied to extended ends of the hollow piston rods of the cyinders, the thickness of the walls of the piston rods may be relatively thin, as all tendency of buckling or binding resulting from driving a piston rod in the conventional manner is eliminated.

The cylinders are adapted to be mounted in the track by other suitable means and the piston rods are also adapted to be mounted on the carriage by other means.

Although the cylinder is illustrated as being particularly adapted for saw mills it may also be used for other machinery and equipment.

It will be understood that other modifications, within the scope of the appended claims, may be made in the design and arrangement of the parts without departing from the spirit of the invention.

What is claimed is:

1. A saw mill mechanism comprising a trackway on the saw mill frame, a carriage reciprocable on said trackway, carriage-reciprocating means including a stationary cylinder rigid and parallel with said trackway and closed at one end, said cylinder being provided with packing glands fittable around a piston rod at the other end and with pressure-fluid inlet and exhaust means, a hollow tubular piston rod passing thru said gland and having an open end within said cylinder and a closed end outside said cylinder and attached to said carriage, whereby fluid admitted to said cylinder moves said carriage by fluid pressure against the closed end of the piston rod remote from said cylinder.

2. A mechanism as in claim 1, wherein a second cylinder and hollow piston, identical with the first described in claim 1, but arranged in the opposite direction, serves to move the carriage in the direction opposite that of the first arrangement.

3. A saw mill carriage actuator comprising a carriage mounted on wheels, a track upon which the carriage is positioned, stationary elongated tubes providing cylinders mounted parallel to and in combination with the track, and elongated tubular piston rods, the outside diameters of which are less than the inside diameters of the cylinders, said piston rods being closed at one end mounted on the carriage at said end and extended lengthwise into and slidably fitting in an end of the cylinders, the ends of the tubular piston rods within the cylinders opening into the cylinders whereby fluid of the cylinders extends through the rods and the pressure of the fluid is applied to inner surfaces of extended ends of the rods whereby the rods are drawn from the cylinders carrying the carriage therewith.

4. A saw mill carriage actuator comprising a carriage mounted on wheels, a track upon which the carriage is positioned, stationary elongated tubes providing cylinders mounted parallel to and in combination with the track, and elongated tubular piston rods, the outside diameters of which are less than the inside diameters of the cylinders, said cylinders having closed ends, and the closed ends of the cylinders being mounted on the carriage and extended telescopically into the cylinders, packing glands on the ends of the stationary cylinders from which the tubular piston rods extend, the ends of the tubular piston rods within the cylinders opening into the cylinders whereby fluid of the cylinders extends through the rods and the pressure of the fluid is applied to inner surfaces of extended ends of the rods whereby the rods are drawn from the cylinders carrying the carriage therewith.

5. A saw mill carriage actuator comprising a carriage mounted on wheels, a track upon which the carriage is positioned, stationary elongated tubes providing cylinders mounted parallel to and in combination with the track, and elongated tubular piston rods, the outside diameters of which are less than the inside diameters of the cylinders, said rods being closed at one end, mounted on the carriage at said end and extended telescopically into the cylinders, the ends of the tubular piston rods within the cylinders opening into the cylinders whereby fluid of the cylinders extends through the rods and the pressure of the fluid is applied to inner surfaces of extended ends of the rods whereby the rods are drawn from the cylinders carrying the carriage therewith, the ends of the stationary cylinders from which the tubular piston rods extend being provided with fluid supply connections.

6. A saw mill carriage actuator comprising a carriage mounted on wheels, a track upon which the carriage is positioned, stationary elongated tubes providing cylinders mounted in combination with the track, and elongated tubular piston rods, the outside diameters of which are less than the inside diameters of the cylinders, said piston rods being closed at one end mounted on the carriage at that end and extended into the cylinders at the other ends, wear elements mounted in lower surfaces of the stationary cylinders and positioned to support the tubular piston rods, the ends of the tubular piston rods within the cylinders opening into the cylnders whereby fluid of the cylinders extends through the rods and the pressure of the fluid is applied to inner surfaces of extended ends of the rods whereby the rods are drawn from the cylinders carrying the carriage therewith.

7. A saw mill carriage actuator comprising a carriage mounted on wheels, a horizontal track upon which the carriage is positioned, stationary elongated tubes providing cylinders mounted parallel to and in combination with the track, elongated tubular piston rods, the outside diameters of which are less than the inside diameters of the cylinders, said piston rods being closed at one end mounted on the carriage at said end and extended into the cylinders, the ends of the tubular piston rods within the cylinders opening into the cylinders whereby fluid of the cylinders extends through the rods and the pressure of the fluid is applied to inner surfaces of extended ends of the rods whereby the rods are drawn from the cylinders carrying the carriage therewith, the ends of the stationary cylinders from which the tubular piston rods extend being provided with fluid supply connections, and spaced supporting blocks positioned in the track for retaining the stationary cylinders and tubular piston rods in horizontal positions.

8. A saw mill carriage actuator comprising a carriage mounted on wheels, a track upon which the carriage is positioned, stationary elongated tubes providing cylinders mounted in combination with the track, and elongated tubular piston rods, the outside diameters of which are less than the inside diameters of the cylinders said piston rods being closed at one end mounted on the carriage at said end and extended into the cylinders, the said elongated tubular piston rods extending below the carriage and mounted on the opposite ends thereof, the ends of the tubular piston rods within the cylinders opening into the cylinders whereby fluid of the cylinders extends through the rods and the pressure of the fluid is applied to inner surfaces of extended ends of the rods whereby the rods are drawn from the cylinders carrying the carriage therewith, the ends of the stationary cylinders from which the tubular piston rods extend being provided with fluid supply connections.

References Cited in the file of this patent

UNITED STATES PATENTS

| Re. 8,160 | Prescott | Apr. 9, 1878 |
|---|---|---|
| 434,657 | Cunningham | Aug. 19, 1890 |
| 531,723 | Hill | Jan. 1, 1895 |
| 651,862 | Kelly | June 19, 1900 |
| 708,598 | Thomas | Sept. 9, 1902 |
| 951,976 | Trout | Mar. 15, 1910 |
| 1,047,600 | Williams | Dec. 17, 1912 |
| 1,165,121 | Pratt | Dec. 21, 1915 |
| 1,283,738 | Green | Nov. 5, 1918 |
| 1,371,862 | Clark | Mar. 15, 1921 |
| 2,569,842 | Zweifel et al. | Oct. 2, 1951 |
| 2,640,513 | Watson et al. | June 2, 1953 |

FOREIGN PATENTS

| 641,957 | Germany | Feb. 18, 1937 |